United States Patent
Shin et al.

(10) Patent No.: US 9,757,999 B2
(45) Date of Patent: Sep. 12, 2017

(54) APPARATUS AND METHOD FOR MONITORING TIRE PRESSURE USING SPEED SECTION

(71) Applicant: HYUNDAI AUTRON CO., LTD., Seongnam-si (KR)

(72) Inventors: Seung-Hwan Shin, Gwangmyeong-si (KR); Seung-Geun Ham, Seongnam-si (KR)

(73) Assignee: Hyundai Autron Co., LTD., Seongnam-si (KR)

( * ) Notice: Subject to any disclaimer, the term of this patent is extended or adjusted under 35 U.S.C. 154(b) by 0 days.

(21) Appl. No.: 15/209,369

(22) Filed: Jul. 13, 2016

(65) Prior Publication Data

US 2017/0015150 A1    Jan. 19, 2017

(30) Foreign Application Priority Data

Jul. 13, 2015  (KR) .......................... 10-2015-0099110

(51) Int. Cl.
  *B60C 23/00*  (2006.01)
  *B60C 23/06*  (2006.01)
(52) U.S. Cl.
  CPC ................................. *B60C 23/062* (2013.01)
(58) Field of Classification Search
  CPC .................................................. B60C 23/062
  See application file for complete search history.

(56) References Cited

U.S. PATENT DOCUMENTS

| | | | | |
|---|---|---|---|---|
| 2004/0260436 | A1* | 12/2004 | Kin ....................... | B60C 23/062 340/442 |
| 2006/0140094 | A1* | 6/2006 | Tabata ............... | G11B 7/00456 369/59.1 |
| 2006/0276984 | A1* | 12/2006 | Kobe .................... | B60C 23/062 702/75 |
| 2010/0191483 | A1* | 7/2010 | Gustavsson ........... | B60C 23/062 702/50 |
| 2010/0318308 | A1* | 12/2010 | Gustavsson ........... | B60C 23/062 702/98 |

\* cited by examiner

*Primary Examiner* — Hai Phan
*Assistant Examiner* — Royit Yu
(74) *Attorney, Agent, or Firm* — Mayer Brown LLP; Hyunho Park (57) ABSTRACT

The present invention relates to an apparatus and a method for monitoring a tire pressure using a speed section. The tire pressure monitoring apparatus using a speed section of the present invention includes a frequency measuring unit which measures frequency data for every wheel mounted on a vehicle; a frequency calculating unit which calculates a mean frequency for every speed section by accumulating the measured frequency data for every predetermined speed section to obtain a mean; a frequency calibration unit which performs the frequency calibration by calculating a deviation of the mean frequency for every adjacent speed section and comparing the calculated deviation of the mean frequency with the predetermined frequency range; and a low pressure determining unit which determines a low pressure by performing the frequency analysis in accordance with the speed section in which the frequency calibration is completed.

14 Claims, 5 Drawing Sheets

APPARATUS AND METHOD FOR MONITORING TIRE PRESSURE USING SPEED SECTION

CROSS-REFERENCE TO RELATED APPLICATIONS

This application claims priority to and the benefit of Korean Patent Application No. 10-2015-0099110 filed in the Korean Intellectual Property Office on Jul. 13, 2015, the entire contents of which are incorporated herein by reference.

TECHNICAL FIELD

The present invention relates to an apparatus and a method for monitoring a tire pressure using a speed section, and more particularly, to an apparatus and a method for monitoring a tire pressure using a speed section which analyze a frequency in accordance with a speed section in which frequency calibration is completed to determine a low pressure.

BACKGROUND ART

Air pressure of a tire is one of the elements that allow a vehicle to safely travel. When the air pressure of the tire is low, a vehicle easily slides, and as a result, there is a possibility that the life-span of the tire is shortened and ride comfort and braking force significantly deteriorate. When the air pressure of the tire decreases, functional problems including deterioration of fuel efficiency, tire wear, and the like may occur. In addition, when the decrease in air pressure is significant, there is a possibility that vehicle damage and danger to human life such as an accident occurrence caused by a driving inoperability state or tire rupture will occur.

However, since most drivers cannot recognize a change in air pressure of the tire, a tire pressure monitoring system (TPMS) which is a tire pressure monitoring system announcing the change in pressure of the tire to the drivers in real time has been developed.

In recent years, the tire pressure monitoring system (TPMS) is mounted on a vehicle, which detects the decrease in air pressure of the tire mounted on the vehicle and announces the detected decrease in air pressure to the driver.

The tire pressure monitoring system (TPMS) announces the decrease in pressure of the tire to the driver to allow the driver to check a pressure state of the tire, thereby solving the problem.

The TPMS may be generally classified into a direct scheme and an indirect scheme.

The direct scheme of TPMS installs a pressure sensor in a tire wheel to directly measure the air pressure of the tire. The direct scheme of TPMS announces the change in air pressure of the tire, which is measured from the pressure sensor attached to the tire to the driver. The indirect scheme of TPMS indirectly estimates the change in air pressure of the tire through a change of a response characteristic (for example, a rotational velocity or a frequency characteristic of the rotational speed) of the tire, which is generated when the air pressure decreases and announces the indirectly estimated change to the driver. Even though the direct scheme of TPMS may accurately detect the lowering of the air pressure of the tire, a dedicated wheel is required and there may be a problem in the performance in an actual environment. Therefore, the direct scheme of TPMS has technical and costly problems.

The indirect scheme of TPMS is a method that estimates the air pressure of the tire from rotation information of the tire. The indirect scheme of TPMS may be, in detail, classified into a dynamic loaded radius (DLR) analysis scheme and a resonance frequency method (RFM) analysis scheme again. They may be briefly called a radius analysis scheme and a frequency analysis scheme.

In a frequency analysis scheme, when the air pressure of the tire decreases, a difference from a tire having a normal air pressure is detected by using when a frequency characteristic of a rotational velocity signal of a wheel is changed. In the frequency analysis scheme, based on a resonance frequency which may be acquired by frequency analysis of the rotational velocity signal of the wheel, when the relevant resonance frequency is calculated to be lower than a reference frequency estimated while initialization, it is determined that the air pressure of the tire decreases.

In a radius analysis scheme, by using a phenomenon in which a dynamic loaded radius of the depressurized tire decreases while driving, and as a result, the tire rotates more rapidly than the normal tire, the pressure decrease is detected by comparing rotational velocities of four tires. In the radius analysis scheme of the tire pressure monitoring system, since it is determined whether the tire is depressurized based on a wheel velocity, the wheel velocity exerts a largest influence on the determination of the depressurization.

The direct scheme of TPMS may accurately sense the air pressure of the tire, but the life-span of a battery is limited and whenever the tire is replaced, the direct scheme of TPMS needs to be installed again. In the direct scheme of TPMS, since a pressure sensor is attached, imbalance of the tire may occur and problems including radio frequency interference and the like may occur. Further, since the direct scheme of TPMS is a scheme that mounts the sensor on the tire to measure the air pressure, the indirect scheme of TPMS has an advantage in that the direct scheme of TPMS measure accurate pressure. On the contrary, the direct scheme of TPMS is constituted by various components including a pressure measurement sensor mounted on the tire, a wireless communication unit for transmitting a measurement value in a general wireless scheme, and the like. Therefore, the direct scheme of TPMS is more expensive and further, higher in failure rate than the indirect scheme of TPMS.

Meanwhile, the indirect scheme of TPMS is a scheme that estimates a loss in air pressure by using a wheel speed sensor which is mounted on the vehicle to measure a wheel speed. In the indirect scheme of TPMS, since the TPMS may be implemented only by an algorithm, additional hardware is not required, which results in a reduced cost. Further, just a little maintenance cost is consumed. The indirect scheme of TPMS has better price competitiveness than the indirect scheme of TPMS. However, since the resonance frequency of the indirect scheme of TPMS varies depending on the wheel speed, accuracy of the indirect scheme of TPMS slightly deteriorates. Since the estimated change in air pressure of the tire may be different from an actual change, the indirect scheme of TPMS may send a false alarm to the driver.

Meanwhile, when a frequency logic is calculated, the indirect scheme of TPMS may accumulate frequencies for every speed section and obtain a mean thereof, to increase the performance. The frequencies accumulated as described above may increase or decrease in proportion to the speed. When the frequencies monotonically increases or monotonically decreases, a base line of the frequency may be clearly evaluated.

However, in some cases, the frequencies accumulated as described above may not increase or decrease in proportion to the speed. In this case, the base line of the frequency may vary or is not accurate, so that accurate frequency analysis may not be performed.

Therefore, in order to set a base line for accurately analyzing the frequency, a logic which may correct the frequency accumulated for frequency sections to increase or decrease in proportion to the speed is required.

SUMMARY OF THE INVENTION

The present invention has been made in an effort to provide an apparatus and a method for monitoring a tire pressure using a speed section which perform frequency calibration by comparing a deviation of a mean frequency calculated for every adjacent speed section with a predetermined frequency range, and analyzing the frequency in accordance with a speed section in which the frequency calibration is completed to determine a low pressure. Therefore, the speed section is moved, thereby performing the accurate calibration.

The present invention has been made in an effort to provide an apparatus and a method for monitoring a tire pressure using a speed section which performs the calibration by moving the speed section to monotonically increase or monotonically decrease the frequency characteristic generated by frequency interference due to disturbance in proportion to the speed section, thereby accurately determining a low pressure through the speed section which is moved while performing calibration.

A first aspect of the present invention provides a tire pressure monitoring apparatus using a speed section including: a frequency measuring unit which measures frequency data for every wheel mounted on a vehicle; a frequency calculating unit which calculates a mean frequency for every speed section by accumulating the measured frequency data for every predetermined speed section to obtain a mean; a frequency calibration unit which performs the frequency calibration by calculating a deviation of the mean frequency for every adjacent speed section and comparing the calculated deviation of the mean frequency with the predetermined frequency range; and a low pressure determining unit which determines a low pressure by performing the frequency analysis in accordance with the speed section in which the frequency calibration is completed.

The frequency calculating unit may compare the frequency data accumulated for every speed section with the predetermined number to generate a valid flag for every speed section and calculate a mean frequency for every speed section when the valid flag is generated for all speed sections.

When the calculated deviation of the mean frequency exceeds the predetermined frequency range, the frequency calibration unit may move the speed section by the predetermined speed value and repeatedly calculate the deviation of the mean frequency for every moved speed section.

When the number of times of calculating the deviation of the mean frequency for every moved speed section is equal to or larger than a predetermined number of times of calculating, the frequency calibration unit may set a speed section having the smallest deviation of the mean frequency among deviations of mean frequencies which are repeatedly calculated to complete the frequency calibration.

When the calculated deviation of the mean frequency exceeds the predetermined frequency range, the frequency calibration unit may adjust the number of speed sections by increasing or decreasing the speed section and repeatedly calculate the deviation of the mean frequency for every adjusted speed section.

When the number of times of calculating the deviation of the mean frequency for every speed section which is increased or decreased is equal to or larger than a predetermined number of times of calculating, the frequency calibration unit may set a speed section having the smallest deviation of the mean frequency among deviations of mean frequencies which are repeatedly calculated to complete the frequency calibration.

The apparatus may further include a data storing unit which stores the predetermined speed section and a speed section for a first wheel in which the calibration is completed in the frequency calibration unit, and the low pressure determining unit may determine a low pressure by performing frequency analysis on other wheels than the first wheel in accordance with the speed section for the first wheel which is completely calibrated.

A second aspect of the present invention provides a tire pressure monitoring method using a speed section, including: measuring frequency data for every wheel mounted on a vehicle; calculating a mean frequency for every speed section by accumulating the measured frequency data for every predetermined speed section to obtain a mean; performing the frequency calibration by calculating a deviation of the mean frequency for every adjacent speed section and comparing the calculated deviation of the mean frequency with the predetermined frequency range; and determining a low pressure by performing the frequency analysis in accordance with the speed section in which the frequency calibration is completed.

In the calculating of a mean frequency, the frequency data accumulated for every speed section may be compared with the predetermined number to generate a valid flag for every speed section and a mean frequency for every speed section may be calculated when the valid flag is generated for all speed sections.

The method may further include moving the speed section by a predetermined speed value when the calculated deviation of the mean frequency exceeds the predetermined frequency range, and in the performing of frequency calibration, the deviation of the mean frequency for every moved speed section may be repeatedly calculated.

In the performing of frequency calibration, when the number of times of calculating the deviation of the mean frequency for every moved speed section is equal to or larger than a predetermined number of times of calculating, a speed section having the smallest deviation of the mean frequency among deviations of mean frequencies which are repeatedly calculated may be set to complete the frequency calibration.

The method may further include: adjusting the number of speed sections by increasing or decreasing a speed section when the calculated deviation of the mean frequency exceeds the predetermined frequency range, and in the performing of frequency calibration, the deviation of the mean frequency for every adjusted speed section may be repeatedly calculated.

In the performing of frequency calibration, when the number of times of calculating the deviation of the mean frequency for every speed section which is increased or decreased is equal to or larger than a predetermined number of times of calculating, a speed section having the smallest deviation of the mean frequency among deviations of mean frequencies which are repeatedly calculated may be set to complete the frequency calibration.

In the determining of a low pressure, the low pressure determining unit may perform frequency analysis on wheels other than the first wheel in accordance with the speed section for the first wheel which is completely calibrated to determine a low pressure.

According to the exemplary embodiment of the present invention, frequency calibration is performed by comparing a deviation of a mean frequency calculated for every adjacent speed section with a predetermined frequency range, and the frequency analysis is performed in accordance with a speed section in which the frequency calibration is completed to determine a low pressure. Therefore, accurate calibration may be performed by moving the speed section.

According to another exemplary embodiment of the present invention, the calibration is performed by moving the speed section to monotonically increase or monotonically decrease the frequency characteristic generated by frequency interference due to disturbance in proportion to the speed section, thereby accurately determining a low pressure through the speed section which is moved while performing calibration.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

When the exemplary embodiment is described, a technology which is well known in the technical field of the present invention and is not directly related with the present invention will not be described. The reason is that any unnecessary descriptions are omitted to clearly transmit the gist of the present invention without obscuring the gist.

By the same reason, in the accompanying drawings, some parts are exaggerated, omitted, or schematically illustrated. Further, an actual size is not fully reflected to the size of each component. In the drawings, like reference numerals denote like or corresponding components.

Figure 1:
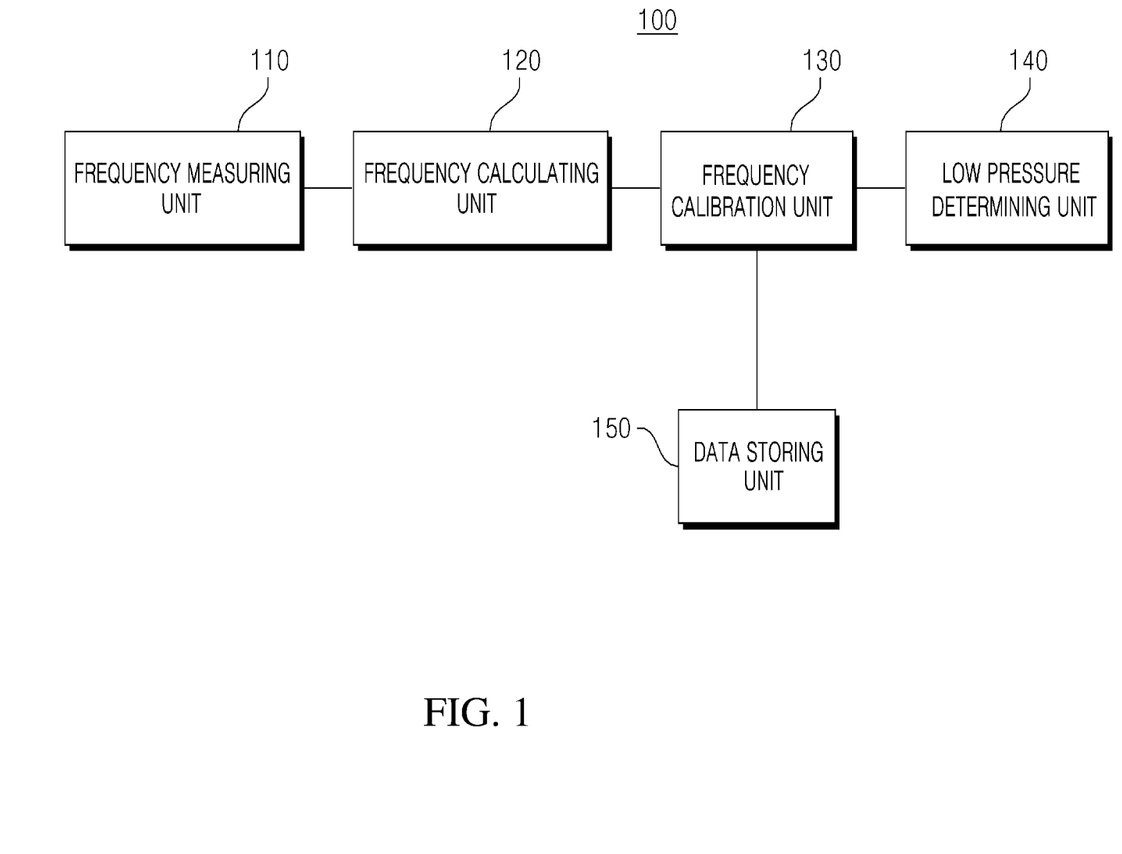
FIG. 1 is a configuration view of a tire pressure monitoring apparatus using a speed section according to an exemplary embodiment of the present invention.

FIG. 1 is a configuration view of a tire pressure monitoring apparatus using a speed section according to an exemplary embodiment of the present invention.

As illustrated in FIG. 1, a tire pressure monitoring apparatus 100 according to an exemplary embodiment of the present invention includes a frequency measuring unit 110, a frequency calculating unit 120, a frequency calibration unit 130, a low pressure determining unit 140, and a data storing unit 150.

Hereinafter, specific configuration and operation of each component of the tire pressure monitoring apparatus 100 using a speed section of FIG. 1 will be described.

The frequency measuring unit 110 measures frequency data for every wheel mounted on a vehicle.

The frequency calculating unit 120 calculates a cumulative mean of frequency data measured by the frequency measuring unit 110 for every predetermined speed section. Next, the frequency calculating unit 120 calculates a mean frequency for every speed section in accordance with a result of a cumulative mean. When a driver inputs a reset button, the frequency calculating unit 120 may calculate a cumulative mean of frequency data for every speed section for every wheel to select a base line of a low pressure of the frequency logic. The frequencies are measured from a plurality of tires mounted on the vehicle. In this case, a frequency of a tire measured when the driver excessively steers a handle or excessively presses a brake pedal or an accelerator pedal may be excluded. Here, the frequency may be a resonance frequency generated in accordance with a wheel speed of the tire.

The frequency calculating unit 120 compares frequency data accumulated for every speed section with a predetermined number to generate a valid flag for every speed section. In other words, when the accumulated frequency data exceeds the predetermined number for every speed section, the frequency calculating unit 120 may generate a valid flag for every speed section.

For example, the frequency calculating unit 120 calculates a mean frequency of the frequency for every speed section. To this end, the frequency calculating unit 120 calculates a mean frequency of first to k-th frequencies using the following Equation 1.

$$\mathrm{mean}(k) = [(k-1)\mathrm{mean}(k-1) + \mathrm{Freq}]/k \qquad \text{Equation 1}$$

Here, mean(k) indicates a mean frequency of first to k-th frequencies and Freq indicates a k-th frequency.

For example, when the number of accumulated frequencies for every speed section is equal to or larger than 300, the frequency calculating unit 120 divides the speed sections by indexes to generate the valid flag to be "Vel_Valid [index]=1".

Here, the index indicates the speed section as represented in the following [Table 1].

TABLE 1

| Index | Speed section |
|---|---|
| index = 1 | Speed section of 30-50 km/h |
| index = 2 | Speed section of 50-70 km/h |
| index = 3 | Speed section of 70-90 km/h |
| index = 4 | Speed section of 90-110 km/h |
| index = 5 | Speed section of 110-130 km/h |

When valid flags are generated in all speed sections, the frequency calculating unit 120 calculates a mean frequency for every speed section.

In the meantime, the frequency calibration unit 130 calculates a deviation of the mean frequency for adjacent speed sections using a mean frequency calculated by the frequency calculating unit 120 for every speed section. Next, the frequency calibration unit 130 compares the calculated deviation of the mean frequency and a predetermined frequency range to perform frequency calibration.

Hereinafter, a frequency calibration process will be described in detail.

When the calculated deviation of the mean frequency exceeds the predetermined frequency range, the frequency calibration unit 130 moves the speed section by the predetermined speed value. Next, the frequency calibration unit 130 repeatedly calculates a deviation of the mean frequency for every moved speed section.

Next, when the number of times of calculating the deviation of the mean frequency for every moved speed section is equal to or larger than a predetermined number of times of calculating, the frequency calibration unit 130 sets a speed section having the smallest deviation of the mean frequency among deviations of mean frequencies which are repeatedly calculated to complete the frequency calibration.

In the meantime, when the calculated deviation of the mean frequency exceeds a predetermined frequency range, the frequency calibration unit 130 increases or decreases the speed section to adjust the number of speed sections. Next, the frequency calibration unit 130 repeatedly calculates a deviation of the mean frequency for every adjusted speed section.

Next, when the number of times of calculating the deviation of the mean frequency for every speed section which is increased or decreased is equal to or larger than a predetermined number of times of calculating, the frequency calibration unit 130 sets a speed section having the smallest deviation of the mean frequency among deviations of mean frequencies which are repeatedly calculated to complete the frequency calibration.

The low pressure determining unit 140 analyzes the frequency in accordance with the speed section in which the frequency calibration is completed in the frequency calibration unit 130. Next, the low pressure determining unit 140 determines a low pressure of the tire mounted on the vehicle in accordance with the frequency analysis result.

In the meantime, the data storing unit 150 stores data for performing frequency analysis and stores data regarding the low pressure determination through the frequency analysis using the speed section, from the frequency measuring unit 110, the frequency calculating unit 120, the frequency calibration unit 130, and the low pressure determining unit.

The data storing unit 150 may store the predetermined speed section and a speed section for a first wheel which is completely calibrated in the frequency calibration unit 130.

Here, the low pressure determining unit 140 may perform frequency analysis on wheels other than the first wheel in accordance with the speed section for the first wheel which is completely calibrated. By doing this, the speed section for the first wheel is similarly applied to other wheels to efficiently perform the frequency analysis.

Figure 2:
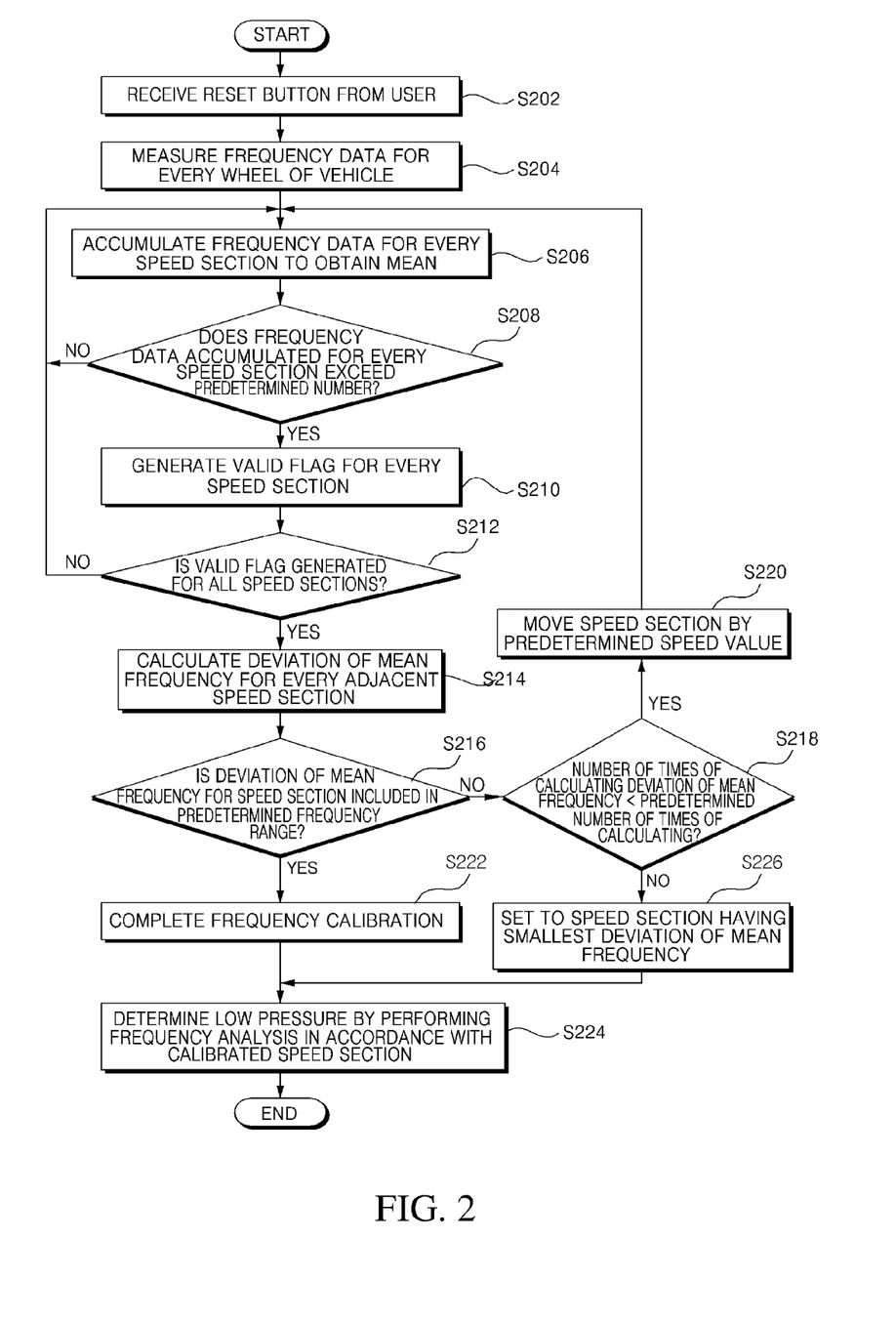
FIG. 2 is a flowchart of a tire pressure monitoring method using a speed section according to an exemplary embodiment of the present invention.

FIG. 2 is a flowchart of a tire pressure monitoring method using a speed section according to an exemplary embodiment of the present invention.

The tire pressure monitoring apparatus 100 receives a reset button from a user in step S202.

The frequency measuring unit 110 measures frequency data for every wheel of a vehicle in step S204.

Next, the frequency calculating unit 120 accumulates the frequency data for every speed section to obtain a mean in step S206.

Next, the frequency calculating unit 120 checks whether the frequency data accumulated for every speed section exceeds a predetermined number in step S208.

As a checking result in step S208, when the frequency data accumulated for every speed section exceeds a predetermined number, the frequency calculating unit 120 generates a valid flag for every speed section in step S210. In contrast, as the checking result in step S208, when the frequency data accumulated for every speed section does not exceed the predetermined number, the frequency calculating unit 120 performs the steps starting from the step S206 of accumulating the frequency data for every speed section to obtain a mean.

The frequency calculating unit 120 checks whether valid flags are generated in all speed sections in step S212.

As the checking result in step S212, when the valid flags are generated in all speed sections, the frequency calibration unit 130 calculates a deviation of the mean frequency for adjacent speed sections in step S214.

The frequency calibration unit 130 checks whether the deviation of the mean frequency for every speed section is included in the predetermined frequency range in step S216.

As the checking result in step S216, when the deviation of the mean frequency for every speed section is not included in the predetermined frequency range, the frequency calibration unit 130 checks whether the number of times of calculating the deviation of the mean frequency is below the predetermined number of times of calculating in step S218.

As the checking result in step S218, when the number of times of calculating the deviation of the mean frequency is below the predetermined number of times of calculating, the frequency calibration unit 130 moves the speed section by the predetermined speed value in step S220. Next, the procedure performs the steps starting from the step S204 of measuring the frequency data for every wheel of the vehicle.

After repeatedly performing the steps S204 to S220, as the checking result in step S216, when the deviation of the mean frequency for every speed section is included in the predetermined frequency range, the frequency calibration unit 130 completes the frequency calibration in step S222.

The low pressure determining unit 140 performs the frequency analysis in accordance with the speed section in which the frequency is calibrated to determine the low pressure of the tire mounted on the vehicle in step S224.

In the meantime, as the checking result in step S218, when the number of times of calculating the deviation of the mean frequency is equal to or large than the predetermined number of times of calculating, the frequency calculation unit 130 checks the speed section having the smallest deviation of the mean frequency, and sets the checked speed section having the smallest deviation to a speed section to be calibrated in step S226.

Figure 3:
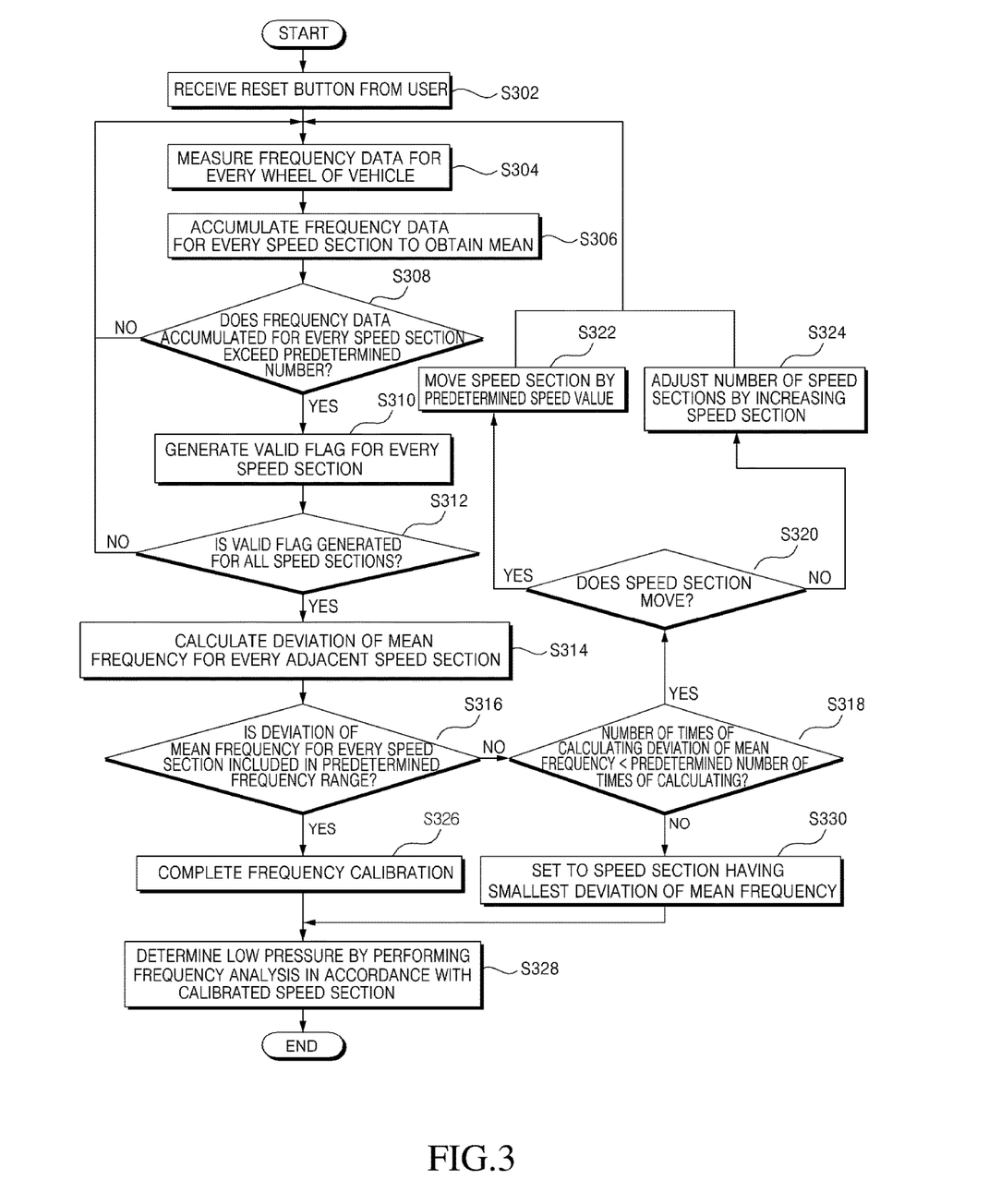
FIG. 3 is a flowchart of a tire pressure monitoring method using a speed section according to another exemplary embodiment of the present invention.

FIG. 3 is a flowchart of a tire pressure monitoring method using a speed section according to another exemplary embodiment of the present invention.

The tire pressure monitoring apparatus 100 receives a reset button from a user in step S302.

The frequency measuring unit 110 measures frequency data for every wheel of a vehicle in step S304.

Next, the frequency calculating unit 120 accumulates the frequency data for every speed section to obtain a mean in step S306.

Next, the frequency calculating unit 120 checks whether the frequency data accumulated for every speed section exceeds a predetermined number in step S308.

As a checking result in step S308, when the frequency data accumulated for every speed section exceeds a predetermined number, the frequency calculating unit 120 generates a valid flag for every speed section in step S310. In contrast, as the checking result in step S308, when the frequency data accumulated for every speed section does not exceed the predetermined number, the frequency calculating unit 120 performs the steps starting from the step S306 of accumulates the frequency data for every speed section to obtain a mean.

The frequency calculating unit 120 checks whether valid flags are generated in all speed sections in step S312.

As the checking result in step S312, when the valid flags are generated in all speed sections, the frequency calibration unit 130 calculates a deviation of the mean frequency for adjacent speed sections in step S314.

The frequency calibration unit 130 checks whether the deviation of the mean frequency for every speed section is included in the predetermined frequency range in step S316.

As the checking result in step S316, when the deviation of the mean frequency for every speed section is not included in the predetermined frequency range, the frequency calibration unit 130 checks whether the number of times of calculating the deviation of the mean frequency is below the predetermined number of times of calculating in step S318.

As the checking result in step S318, when the number of times of calculating the deviation of the mean frequency is below the predetermined number of times of calculating, the frequency calibration unit 130 checks whether to set to move the speed section in step S320.

As the checking result 320, when it is set to move the speed section, the frequency calibration unit 130 moves the speed section by a predetermined speed value in step S322.

In contrast, as the checking result 320, when it is set not to move the speed section, that is, it is set to adjust the number of speed sections, the frequency calibration unit 130 increases or decreases the speed section by the predetermined section to adjust the number of speed sections in step S324.

Next, the procedure performs the steps starting from the step S304 of measuring the frequency data for every wheel of the vehicle.

After repeatedly performing the steps S304 to S324, as the checking result in step S316, when the deviation of the mean frequency for every speed section is included in the predetermined frequency range, the frequency calibration unit 130 completes the frequency calibration in step S326.

The low pressure determining unit 140 performs the frequency analysis in accordance with the speed section in which the frequency is calibrated to determine the low pressure of the tire mounted on the vehicle in step S328.

In the meantime, as the checking result in step S318, when the number of times of calculating the deviation of the mean frequency is equal to or larger than the predetermined number of times of calculating, the frequency calculation unit 130 checks the speed section having the smallest deviation of the mean frequency, and sets the checked speed section having the smallest deviation to a speed section to be calibrated in step S330.

Figure 4:
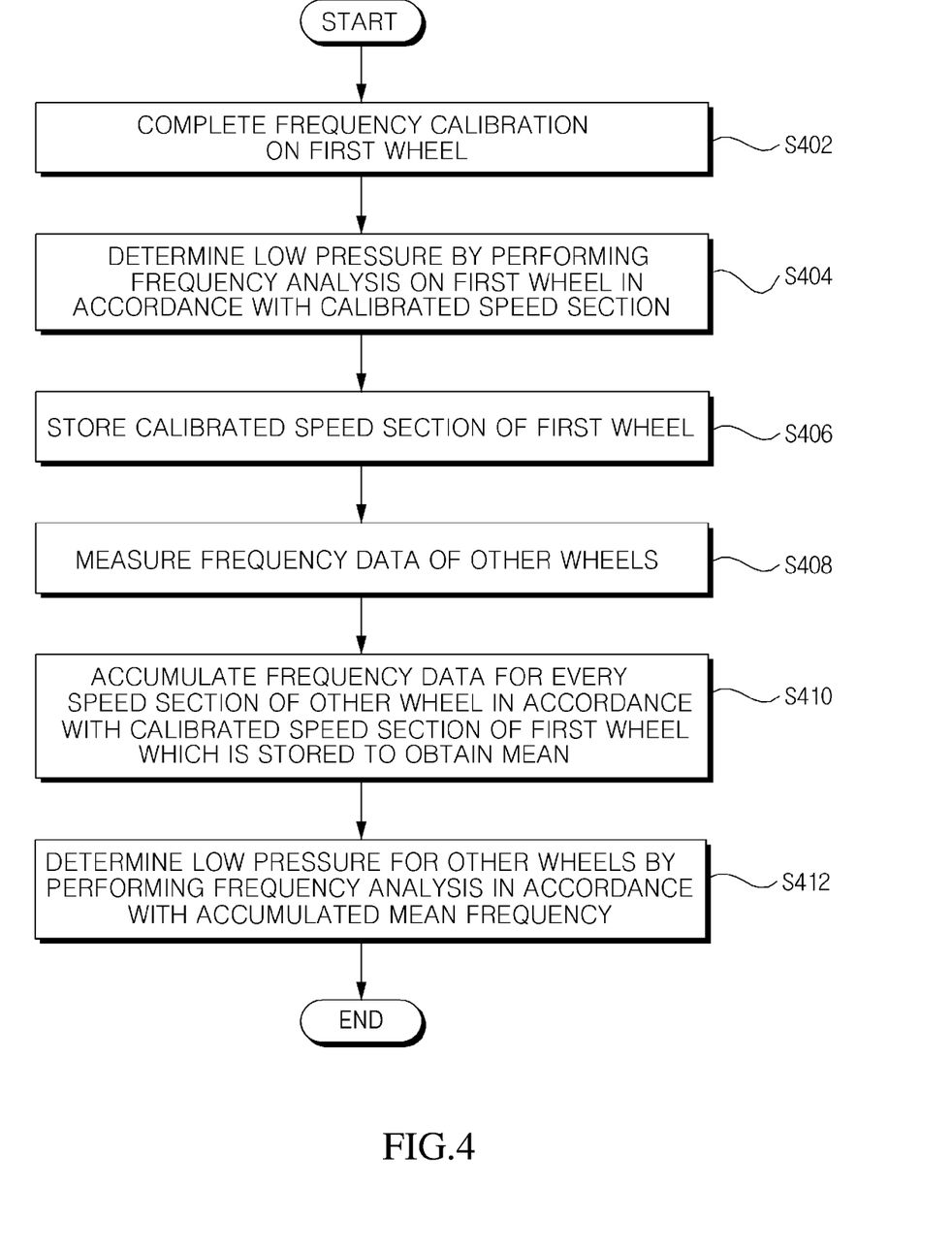
FIG. 4 is a flowchart of a tire pressure monitoring method using a speed section of a first wheel according to an exemplary embodiment of the present invention.

FIG. 4 is a flowchart of a tire pressure monitoring method using a speed section of a first wheel according to an exemplary embodiment of the present invention.

The frequency calibration unit 130 completes the frequency calibration on a first wheel in step S402.

The frequency calibration unit 130 performs frequency analysis on the first wheel in accordance with the speed section in which the frequency calibration is performed to determine the low pressure in step S404.

Here, the frequency calibration unit 130 stores the calibrated speed section of the first wheel in the data storing unit 150 in step S406.

In the meantime, the frequency measuring unit 110 measure frequency data of wheels other than the first wheel in step S408.

The frequency calculating unit 120 accumulates the frequency data for every speed section of the other wheels in accordance with the calibrated speed section of the first wheel stored in the data storing unit 150 and calculates a mean thereof in step S410.

The low pressure determining unit 140 performs the frequency analysis in accordance with the cumulative mean frequency to determine the low pressure of the other wheels in step S412. Here, the frequency calibration unit 130 does not perform the frequency calibration, but uses the calibrated speed section of the first wheel as it is.

Figure 5:
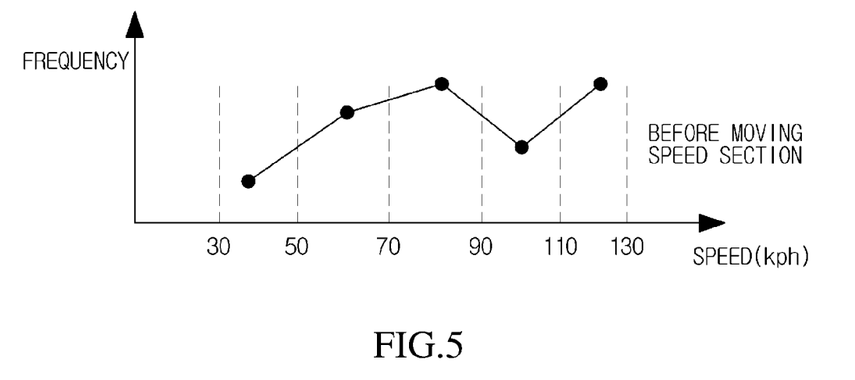
FIG. 5 is an explanatory view of a mean frequency for every speed section before moving the speed section according to an exemplary embodiment of the present invention.

FIG. 5 is an explanatory view of a mean frequency for every speed section before moving the speed section according to an exemplary embodiment of the present invention.

For example, the mean frequency of the speed section is calculated within a speed range including the speed section of 30 kph to 130 kph. Here, the speed range is not limited to a specific speed range, but may be a different speed range in accordance with a driving speed of the vehicle.

As illustrated in FIG. 5, the speed section of 30 kph to 130 kph is divided by 20 kph of speed section. The frequency calculating unit 120 calculates the mean frequency for every speed section which is divided by 20 kph of speed section.

The mean frequency before moving the speed section calculated in the frequency calculating unit 120 has a tendency to monotonically increase at every 20 kph speed section in the speed section of 30 kph to 90 kph.

However, the deviation of the mean frequency in the speed section of 90 kph to 110 kph which is adjacent to the speed section of 70 kph to 90 kph does not monotonically increase as compared with the previous adjacent section. That is, the deviation of the mean frequencies in the speed section of 90 kph to 110 kph which is adjacent to the speed section of 70 kph to 90 kph has a negative deviation value, so that the deviation has a negative deviation value which is reduced as compared with the previous adjacent section.

The deviation of the mean frequency in the speed section of 110 kph to 130 kph which is adjacent to the speed section of 90 kph to 110 kph increases again as compared with the previous adjacent section. That is, the deviation of the mean frequencies in the speed section of 110 kph to 130 kph which is adjacent to the speed section of 90 kph to 110 kph has a positive deviation value, so that the deviation has a deviation value which is increased as compared with the previous adjacent section.

Figure 6:
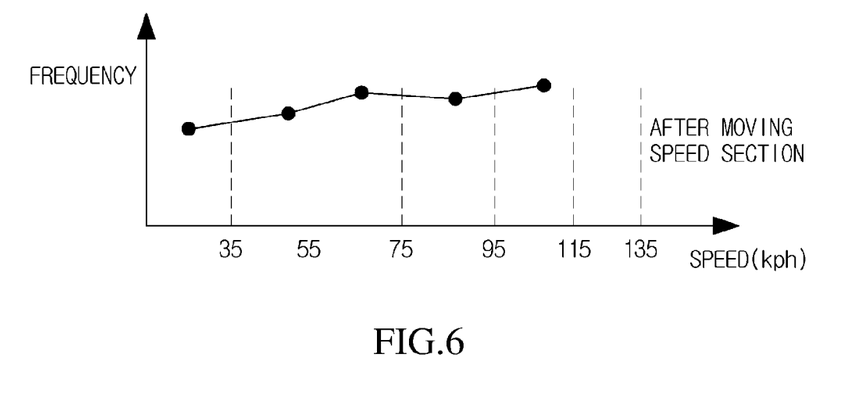
FIG. 6 is an explanatory view of a mean frequency for every speed section after moving the speed section according to an exemplary embodiment of the present invention.

FIG. 6 is an explanatory view of a mean frequency for every speed section after moving the speed section according to an exemplary embodiment of the present invention.

In FIG. 6, a mean frequency for every speed section after moving the speed section illustrated in FIG. 5 by a predetermined speed value (for example, 5 kph) is illustrated.

As illustrated in FIG. 6, the speed section of 35 kph to 135 kph is divided by 20 kph of speed section. The frequency calculating unit 120 calculates the mean frequency for every speed section starting from the speed of 35 kph which is divided by 20 kph of speed section.

That is, the frequency calibration unit 130 moves the speed section illustrated in FIG. 5 by a speed value of 5 kph, to the right. The frequency calibration unit 130 moves the speed section of 30 kph to 50 kph, the speed section of 50 kph to 70 kph, the speed section of 70 kph to 90 kph, the speed section of 90 kph to 110 kph, and the speed section of 110 kph to 130 kph by the speed value of 5 kph to the right.

Next, mean frequencies for every speed section in the speed section of 35 kph to 55 kph, the speed section of 55 kph to 75 kph, the speed section of 75 kph to 95 kph, the speed section of 95 kph to 115 kph, and the speed section of 115 kph to 135 kph which are moved by the speed value of 5 kph are measured. The frequency calibration unit 130 calculates the mean frequency for every speed section. The mean frequency for every speed section after moving the speed section is illustrated in FIG. 6.

When the result of calculating a mean frequency for every speed section after moving the speed section is reviewed, the mean frequency has a tendency to monotonically increase for every speed section of 20 kph in all speed ranges in which the speed section of 30 kph to 130 kph is included. That is, the deviation of the mean frequency in the speed section which is adjacent to each speed section is equal to or smaller than the predetermined frequency range as compared with the previous adjacent section.

Figure 7:
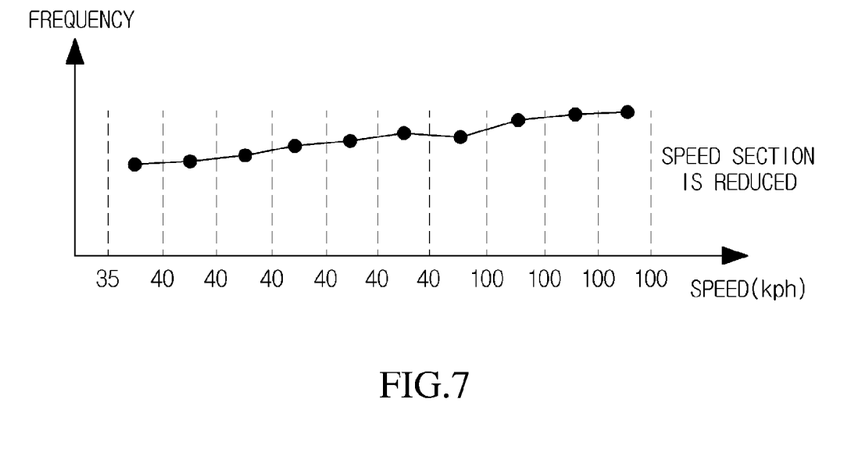
FIG. 7 is an explanatory view of a mean frequency for every speed section after decreasing the speed section according to an exemplary embodiment of the present invention.

FIG. 7 is an explanatory view of a mean frequency for every speed section after decreasing the speed section according to an exemplary embodiment of the present invention.

In FIG. 7, a mean frequency for every decreased speed section after decreasing the speed section illustrated in FIG. 5 by a predetermined speed value (for example, 10 kph) is illustrated.

As illustrated in FIG. 7, the speed section of 30 kph to 130 kph is divided by the speed section of 10 kph which is reduced by a speed value of 10 kph from the speed section of 20 kph of FIG. 5. The frequency calculating unit 120 calculates a mean frequency for every speed section which is divided by the speed section of 10 kph from the speed of 30 kph so that five speed sections are divided into ten speed sections.

That is, the frequency calibration unit 130 adjusts the number of speed sections such that the speed section which is divided by the speed of 20 kph as illustrated in FIG. 5 is adjusted to ten speed sections divided by the speed value of 10 kph. The frequency calibration unit 130 divides the five speed sections, that is, the speed section of 30 kph to 50 kph, the speed section of 50 kph to 70 kph, the speed section of 70 kph to 90 kph, the speed section of 90 kph to 110 kph, and the speed section of 110 kph to 130 kph by two speed sections to adjust the number of speed sections to be ten.

Next, the mean frequency for every speed section from the speed section of 30 kph to 40 kph to the speed section of 120 kph to 130 kph is measured. The frequency calibration unit 130 calculates the mean frequency of ten speed sections. The mean frequency for every speed section after reducing the speed section is illustrated in FIG. 7.

When the result of calculating a mean frequency for every speed section after adjusting the number of speed sections by reducing the speed section is reviewed, the mean frequency has a tendency to monotonically increase for every speed section of 10 kph in all speed ranges in which the speed section of 30 kph to 130 kph is included. That is, the deviation of the mean frequency in the speed section which is adjacent to each speed section is equal to or smaller than the predetermined frequency range as compared with the previous adjacent section.

As described above, when the calculated deviation of the mean frequency exceeds the predetermined frequency range, the frequency calibration unit 130 may move the speed section by a predetermined speed value as illustrated in FIG. 6.

When the calculated deviation of the mean frequency exceeds the predetermined frequency range, the frequency calibration unit 130 adjusts the number of speed sections by increasing or decreasing the speed sections, as illustrated in FIG. 7, and repeatedly calculates the deviation of the mean frequency for every adjusted speed section.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A tire pressure monitoring apparatus using a speed section, comprising:
   a frequency measuring unit which measures frequency data for every wheel mounted on a vehicle;
   a frequency calculating unit which calculates a mean frequency for every speed section by accumulating the measured frequency data for every predetermined speed section to obtain a mean value;
   a frequency calibration unit which performs the frequency calibration by calculating a deviation of the mean frequency for every adjacent speed section and comparing the calculated deviation of the mean frequency with a predetermined frequency range; and
   a low pressure determining unit which determines a low pressure by performing the frequency analysis in accordance with the speed section in which the frequency calibration is completed.

2. The apparatus according to claim 1, wherein the frequency calculating unit compares the frequency data accumulated for every speed section with a predetermined number to generate a valid flag for every speed section and calculates the mean frequency for every speed section when the valid flag is generated for all speed sections.

3. The apparatus according to claim 1, wherein when the calculated deviation of the mean frequency exceeds the predetermined frequency range, the frequency calibration unit moves the speed section by the predetermined speed value and repeatedly calculates the deviation of the mean frequency for every moved speed section.

4. The apparatus according to claim 3, wherein when the number of times of calculating the deviation of the mean frequency for every moved speed section is equal to or larger than a predetermined number of times of calculating, the frequency calibration unit sets a speed section having the smallest deviation of the mean frequency among deviations of mean frequencies which are repeatedly calculated of a speed section to be calibrated to complete the frequency calibration.

5. The apparatus according to claim 1, wherein when the calculated deviation of the mean frequency exceeds the predetermined frequency range, the frequency calibration unit adjusts the number of speed sections by increasing or decreasing the speed section and repeatedly calculates the deviation of the mean frequency for every adjusted speed section.

6. The apparatus according to claim 5, wherein when the number of times of calculating the deviation of the mean frequency for every speed section which is increased or decreased is equal to or larger than a predetermined number of times of calculating, the frequency calibration unit sets a speed section having the smallest deviation of the mean frequency among deviations of mean frequencies which are repeatedly calculated of a speed section to be calibrated to complete the frequency calibration.

7. The apparatus according to claim 1, further comprising:
a data storing unit which stores the predetermined speed section and a speed section for a first wheel in which the calibration is completed in the frequency calibration unit,
wherein the low pressure determining unit performs frequency analysis on wheels other than the first wheel in accordance with the speed section for the first wheel which is completely calibrated to determine a low pressure.

8. A tire pressure monitoring method using a speed section, comprising:
measuring frequency data for every wheel mounted on a vehicle;
calculating a mean frequency for every speed section by accumulating the measured frequency data for every predetermined speed section to obtain a mean;
performing the frequency calibration by calculating a deviation of the mean frequency for every adjacent speed section and comparing the calculated deviation of the mean frequency with a predetermined frequency range; and
determining a low pressure by performing the frequency analysis in accordance with the speed section in which the frequency calibration is completed.

9. The method according to claim 8, wherein in the calculating of a mean frequency, the frequency data accumulated for every speed section is compared with a predetermined number to generate a valid flag for every speed section and a mean frequency for every speed section is calculated when the valid flag is generated for all speed sections.

10. The method according to claim 8, further comprising:
moving the speed section by a predetermined speed value when the calculated deviation of the mean frequency exceeds the predetermined frequency range,
wherein in the performing of frequency calibration, the deviation of the mean frequency for every moved speed section is repeatedly calculated.

11. The method according to claim 10, wherein in the performing of frequency calibration, when the number of times of calculating the deviation of the mean frequency for every moved speed section is equal to or larger than a predetermined number of times of calculating, a speed section having the smallest deviation of the mean frequency among deviations of mean frequencies which are repeatedly calculated is set to complete the frequency calibration.

12. The method according to claim 8, further comprising:
adjusting the number of speed sections by increasing or decreasing a speed section when the calculated deviation of the mean frequency exceeds the predetermined frequency range;
wherein in the performing of frequency calibration, the deviation of the mean frequency for every adjusted speed section is repeatedly calculated.

13. The method according to claim 12, wherein in the performing of frequency calibration, when the number of times of calculating the deviation of the mean frequency for every speed section which is increased or decreased is equal to or larger than a predetermined number of times of calculating, a speed section having the smallest deviation of the mean frequency among deviations of mean frequencies which are repeatedly calculated is set to complete the frequency calibration.

14. The method according to claim 8, wherein in the determining of a low pressure, performs frequency analysis on wheels other than the first wheel in accordance with the speed section for the first wheel which is completely calibrated to determine a low pressure.

\* \* \* \* \*